Dec. 5, 1950 — G. V. WOODLING — 2,532,352
FLEXIBLE BUT SUPPORTED TUBE COUPLING SLEEVE
Filed March 18, 1949

INVENTOR.
George V. Woodling

Patented Dec. 5, 1950

2,532,352

UNITED STATES PATENT OFFICE 2,532,352

FLEXIBLE BUT SUPPORTED TUBE COUPLING SLEEVE

George V. Woodling, Cleveland, Ohio

Application March 18, 1949, Serial No. 82,226

1 Claim. (Cl. 285—122)

My invention relates in general to connecting devices and more particularly to connecting devices for tube fittings which will absorb vibration.

An object of my invention is the provision of a clamping sleeve having contractible thin flexible spring fingers for engaging the tube to readily absorb vibration, taken in combination with a sleeve nut having an annular internal surface closely surrounding the thin flexible fingers, whereby the annular internal surface externally supports the flexible fingers against excessive vibrational movements of the tube to thereby prevent the thin flexible fingers from becoming deformed.

Another object of my invention is the provision of a clamping sleeve having contractible flexible spring fingers considerably thinner than those in the prior art whereby they are readily flexible upon vibrational movements of the tube, taken in combination with external support means to support the thin flexible fingers against excessive vibrational movements of the tube and thereby prevent the thin flexible fingers from becoming deformed.

Another object of my invention is the provision of a clamping sleeve having contractible flexible spring fingers with a wall thickness ranging from approximately 20 to 30 thousandths of an inch, taken in combination with a sleeve nut having an annular internal surface closely surrounding the thin fingers and defining an annular clearance space therewith ranging from approximately 1 to 6 thousandths of an inch thereacross with the fingers in their uncontracted position.

Other objects and a fuller understanding of my invention may be had by referring to the following description and claim taken in conjunction with the accompanying drawings, in which:

Figure 1:
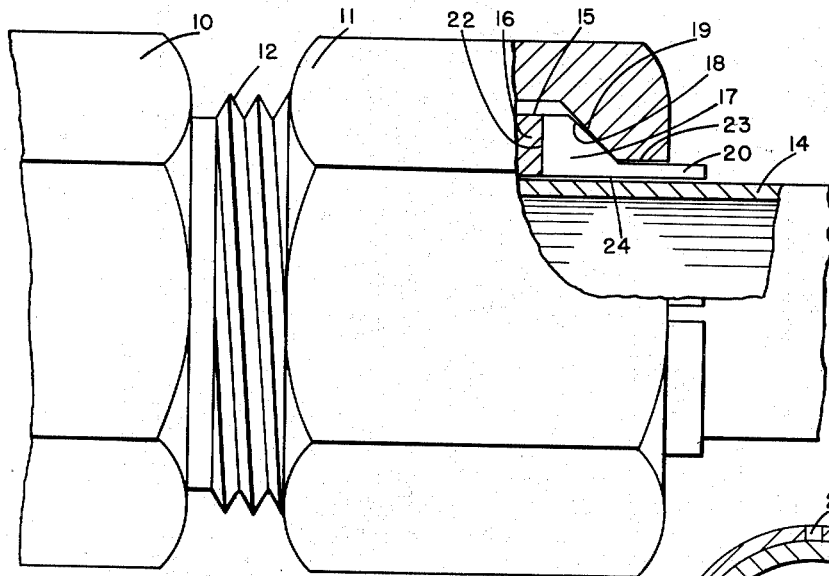
Figure 1 is a longitudinal view of a clamping sleeve and nut embodying the features of my invention, with a portion cut away to illustrate the invention.
Figure 2:
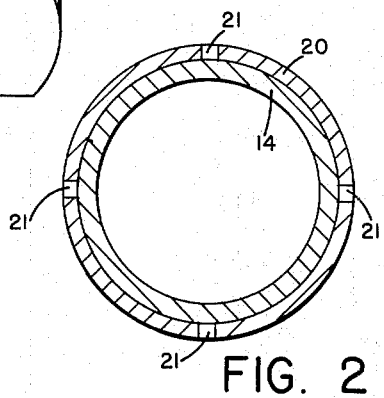
Figure 2 is a cross-sectional view taken along the line 2—2 of Figure 4.

With reference to the drawings, my invention is shown as being applied to a tube fitting or coupling device comprising a connector body or coupling element 10, a tube 14 adapted to be connected thereto, a clamping sleeve 15 having a bore 24 to closely receive the tube 14, and a sleeve nut 11 which is adapted to press the clamping sleeve 15 toward the end of the connector body 10. The right-hand end of the connector body 10 is provided with male threads 12 to which is threadably attached the sleeve nut 11 having female threads which threadably engage the male threads 12.

The left-hand end portion of the sleeve 15 comprises a continuous annular body 16 which may be adapted to work as a flaretype sleeve or as a no-flare type sleeve. When adapted to work as a flare type sleeve, the continuous annular body 16 at its left-hand end would be formed to fit against the back side of the flare of the tube. When adapted to work as a no-flare type sleeve, the continuous annular body 16 at its left-hand end would be formed to cam into a tapering annular throat of the connector body and bite the tube to make a sealing engagement therewith. The present invention of the sleeve is applicable to either the flare or no-flare type of sleeve.

Integrally connected to and extending away from the continuous annular body 16 are a plurality of segmental contractible spring fingers 17 adapted to grip the tube to absorb vibration. The spring fingers 17 which may comprise any number, being four shown in the drawings, are made by slotting the sleeve at annular intervals 21 thereabout. The slots terminate at the line 22. The spring fingers 17 at their anchored end have provided thereon an external cam shoulder 18 having a longitudinal length less than that of the fingers. The remaining part of the fingers extends away from the cam shoulder 18 and constitutes a flexible tail portion 20 which grips the tube 14 when the sleeve nut 11 is tightened.

Figure 3:
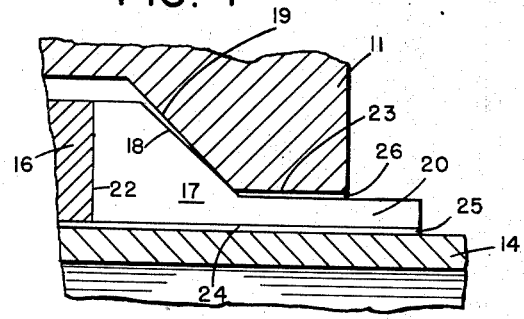
Figure 3 is an enlarged fragmentary view of the sleeve and nut shown in Figure 1, the spring fingers being illustrated in their uncontracted position.
Figure 4:
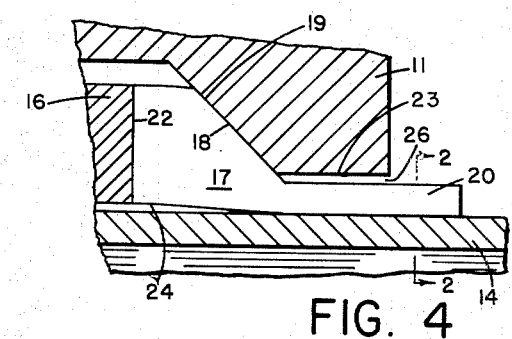
Figure 4 is a view similar to Figure 3, with the spring fingers being illustrated in their contracted or clamped position about the tube.

The sleeve nut 11 is provided with an internal clamping shoulder 19 which engages the cam shoulder 18 on the sleeve to contract the tail portion 20 about the tube. As shown in Figure 3, the angle of the clamping shoulder 19 is slightly greater than the angle of the cam shoulder 18, so that the heel of the clamping shoulder 19 first engages the lower end of the cam shoulder 18 when the sleeve nut 11 is initially tightened. As the sleeve nut 11 is further tightened, the spring fingers 17 flex or contract inwardly until the clamping shoulder 19 fits tightly against the cam shoulder 18.

Figure 5:
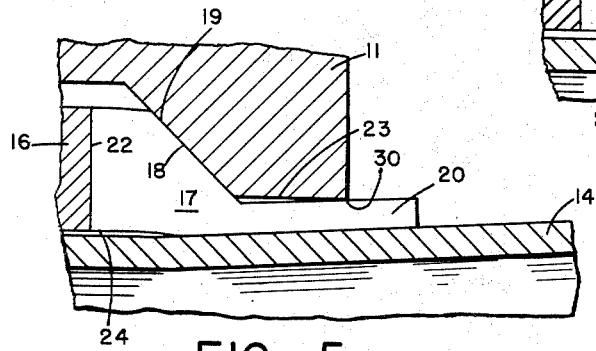
Figure 5 is a view similar to Figure 3 with the annular internal surface of the nut externally supporting the thin flexible spring fingers incident to excessive vibrational movements of the tube.

The sleeve nut is provided with an annular internal surface 23 closely surrounding the tail portion 20 of the fingers and defines an annular clearance space 26 therewith ranging from approximately 1 to 6 thousandths of an inch thereacross with the spring fingers 17 in their uncontracted position as shown in Figure 3. The tail portion 20 of the spring fingers has a thin wall of smaller section than that found in sleeves in the prior art, and in the present invention the thin tail portion 20 ranges from approximately 20 to 30 thousandths of an inch thick. Being extra thin compared to similar structures in the prior art, the tail portion 20 is readily flexible upon vibration or other lateral movements of the tube. For nominal vibrational movements of the tube, the tail portion 20 of the fingers 17 freely flexes within the radial limits of the clearance space 26, and thus superior results are obtained with respect to dampening vibrations without gripping the tube too hard. In other words, the extra thin tail portion 20 of the fingers 17 makes a friendly grip with the tube as compared to a hard grip, as would be the case if the tail portion 20 of the finger were thicker as found in the prior art. For excessive vibrational or flexible movements of the tube, such as shown in Figure 5, the tail portion 20 of the fingers flexes outwardly and engages the annular internal surface 23 of the sleeve nut at the place 30 which serves as a fulcrum to support the thin tail portion 20 and prevents the thin wall from becoming deformed. The annular internal surface 23 supports the thin tail portion 20 of the fingers before the fingers are flexed or bent beyond their yield point. Thus the fingers retain their resiliency and resume normal flexure when the excessive vibration ceases. Depending upon the matching of tolerances, the tube may flex through an angle of approximately 1 to 5 degrees before the thin tail portion 20 of the fingers engages the annular internal surface 23 of the sleeve nut.

The present invention is for tubing ranging in size from ¼ inch to and including ¾ inch. The sleeve and nut in Figure 1 are drawn substantially four times scale for a ½ inch tube. The Figures 2, 3, 4 and 5 are drawn substantially eight times scale for a ½ inch tube. The clearance 25 between the bore of the sleeve 15 and the outside of the tube 14 may range in actual practice from approximately 2 to 8 thousandths of an inch depending upon the tolerance of the tube and the bore of the sleeve.

The sleeve is preferably constructed of alloy steel, alloy brass or other metal of high tensile strength and capable of being treatable or hardenable throughout its mass to both a resiliency and a hardness value greater than that of the insertable tube. For a steel sleeve, I find that steel known as 4140, heat-treated throughout its entire mass and tempered to a hardness value of approximately 40 to 48 Rockwell, is satisfactory. For a brass sleeve, used principally for copper tubing, the sleeve may be made of alloy brass which has both resiliency and a hardness value greater than that of the tube. The brass sleeve may be made of high tensile strength alloy brass, such as that manufactured by leading brass manufacturing companies.

When the nut 11 is released, the thin flexible fingers 17 spring back away from the tube, substantially to their original position. The sleeves may thus be re-used or re-tightened any number of times. The live resiliency of the fingers enables them to function as an internal lock device for the nut. The cam shoulder 18 constitutes the sole support for the tail portion 20 of the fingers for normal vibrational movements of the tube and thus the fingers operate as cantilever springs within the radial limits of the annular clearance space 26.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim as my invention:

In a sleeve connection, a first sleeve having a bore adapted to closely receive an insertable member having a substantially cylindrical outer surface, said sleeve comprising a continuous annular body and a plurality of segmental contractible fingers integrally anchored to and extending away from the continuous annular body, said fingers at their anchored ends having provided thereon an external cam shoulder having a longitudinal length less than that of the fingers, the remaining part of said fingers extending away from the cam shoulder and constituting a flexible tail portion contractible inwardly about the insertable member, a second sleeve surrounding the first sleeve and having an internal clamping shoulder for engaging the cam shoulder on the first sleeve to contract the tail portion about the insertable member, said second sleeve having an annular internal surface closely surrounding said tail portion and defining an annular clearance space therewith ranging from approximately 1 to 6 thousandths of an inch thereacross with the fingers in their uncontracted position, said tail portion having a thin wall thickness of less than 30 thousandths of an inch and being readily flexible upon vibration or other lateral movement of the insertable member, said annular internal surface of the second sleeve supporting said tail portion against excessive flexible movements and thereby preventing the thin wall of the tail portion from becoming deformed.

GEORGE V. WOODLING.

REFERENCES CITED

The following references are of record in the file of this patent:

UNITED STATES PATENTS

| Number | Name | Date |
| --- | --- | --- |
| 109,080 | Kreidel | Nov. 9, 1939 |
| 2,201,404 | Kreidel | May 21, 1940 |
| 2,452,278 | Woodling | June 14, 1949 |

FOREIGN PATENTS

| Number | Country | Date |
| --- | --- | --- |
| 109,080 | Australia | Nov. 9, 1939 |